United States Patent [19]

Nicoloff

[11] 4,181,152
[45] Jan. 1, 1980

[54] CONTROL MANIFOLD

[75] Inventor: Nicholas Nicoloff, San Diego, Calif.

[73] Assignee: The United States of America as represented by the Secretary of the Navy, Washington, D.C.

[21] Appl. No.: 883,752

[22] Filed: Mar. 6, 1978

[51] Int. Cl.² ............................................. F16K 35/14
[52] U.S. Cl. ................................. 137/637.1; 114/238; 251/297
[58] Field of Search ....................... 137/637, 637.1, 626

[56] References Cited

U.S. PATENT DOCUMENTS

| 1,309,295 | 7/1919 | Magee | 137/637.1 |
| 2,016,577 | 10/1935 | Pearson | 137/637.1 |

Primary Examiner—Martin P. Schwadron
Assistant Examiner—Richard Gerard
Attorney, Agent, or Firm—Richard S. Sciascia; Ervin F. Johnston; Thomas G. Keough

[57] ABSTRACT

A manifold controls the venting of pressurized gas from an ordnance launcher. A manifold block is provided with a number of passageways which communicate with a pair of recesses machined in the block. A high pressure gas valve is disposed in one of the recesses while a venting valve is rotatably positioned in the other recess. Ports are included in both of the valves so that when they are rotated a venting sequence of the launcher is effected. A specifically configured handle is secured to each of the valves and a spring biased pawl engages a number of teeth on the venting valve handle to allow only one direction of rotation. The configurations of the handles, the ratchet and pawl ensure a preestablished venting sequence and readying of the launcher for another shot.

7 Claims, 11 Drawing Figures

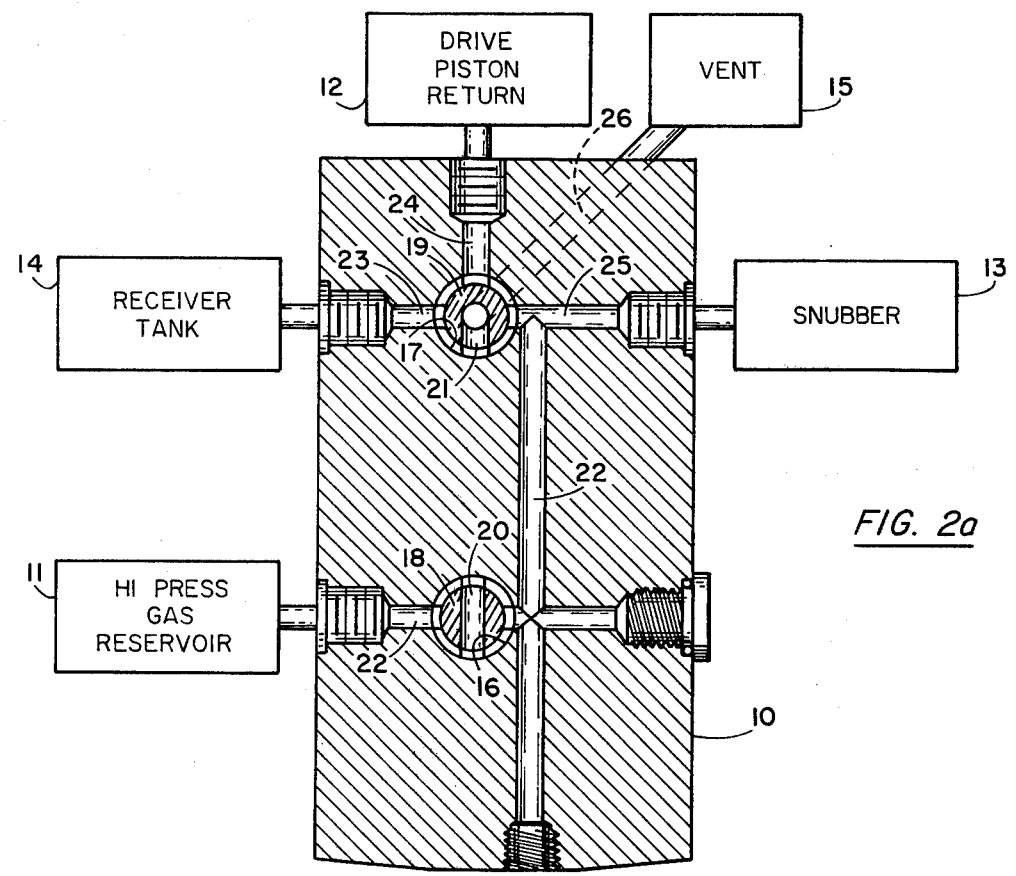
*FIG. 2a*
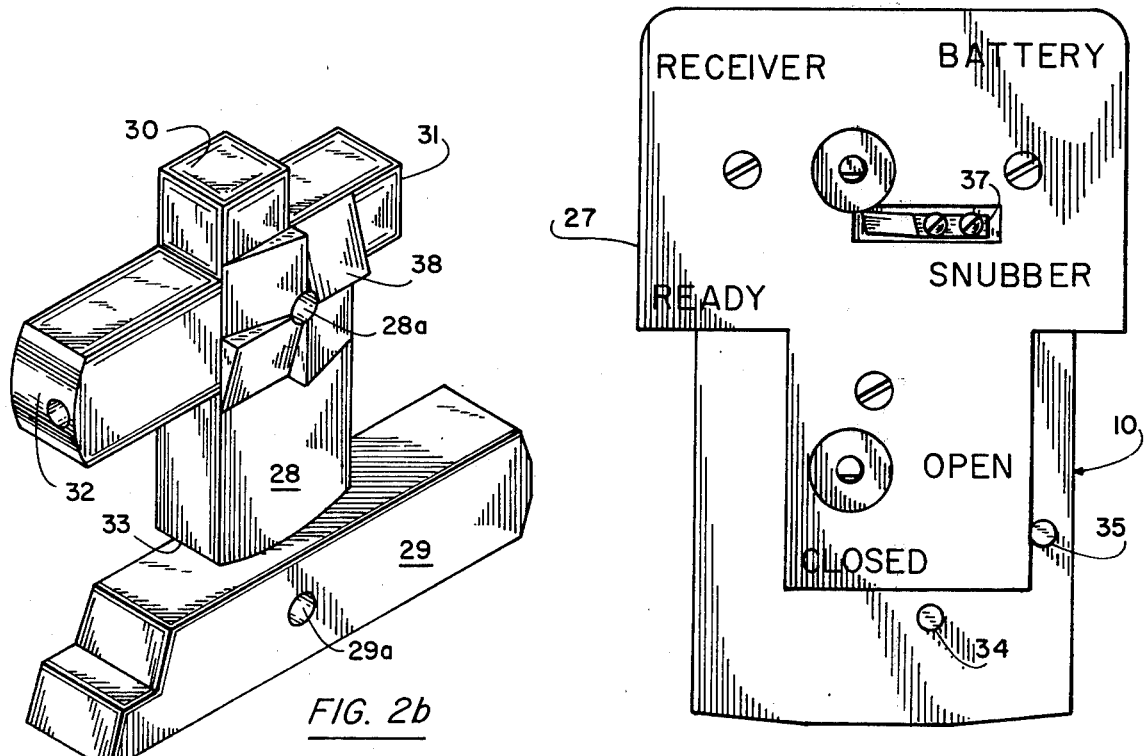
*FIG. 2b*
*FIG. 2c*

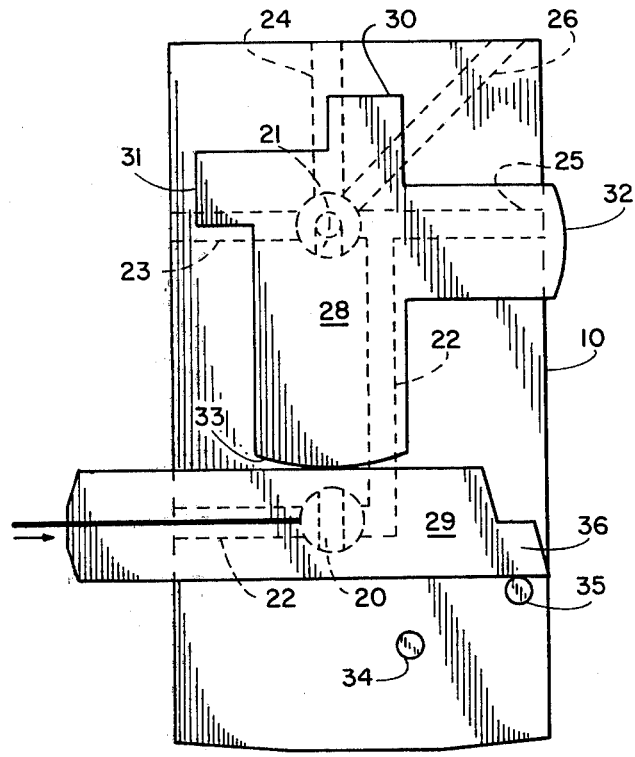
FIG. 3: "Ready to Fire"
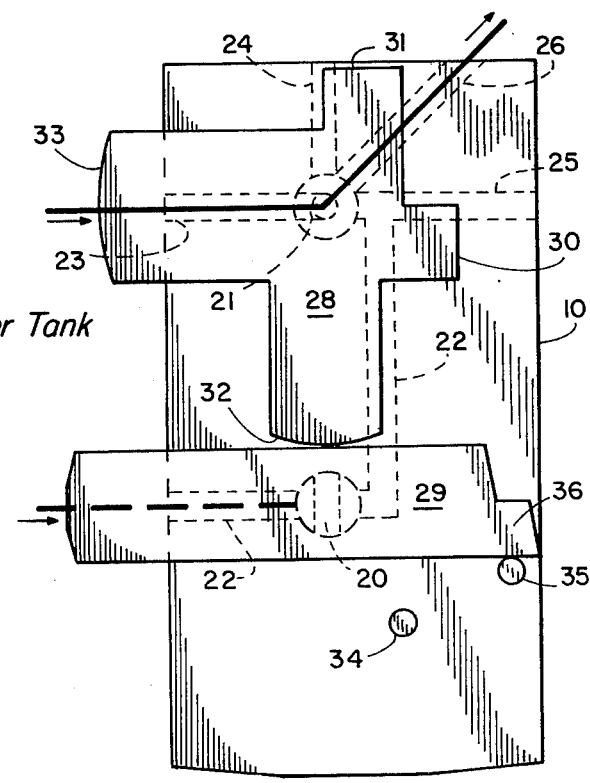
FIG. 4: Vent Receiver Tank

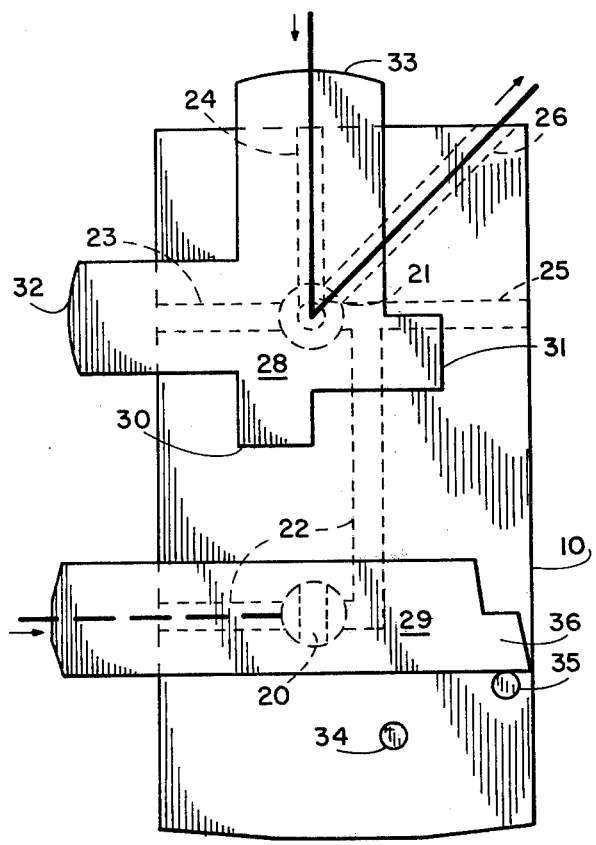
FIG. 5: Vent Drive Piston
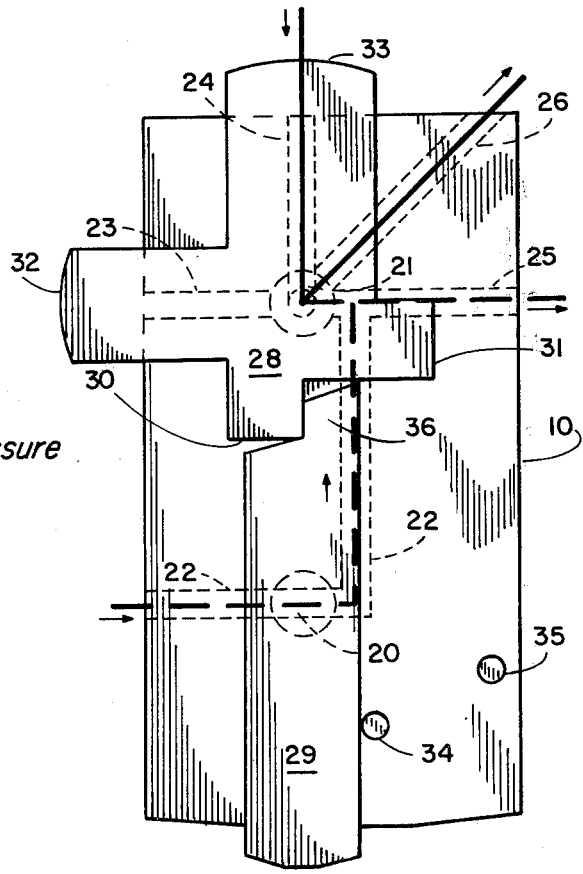
FIG. 6: Drive Piston Pressure Assist

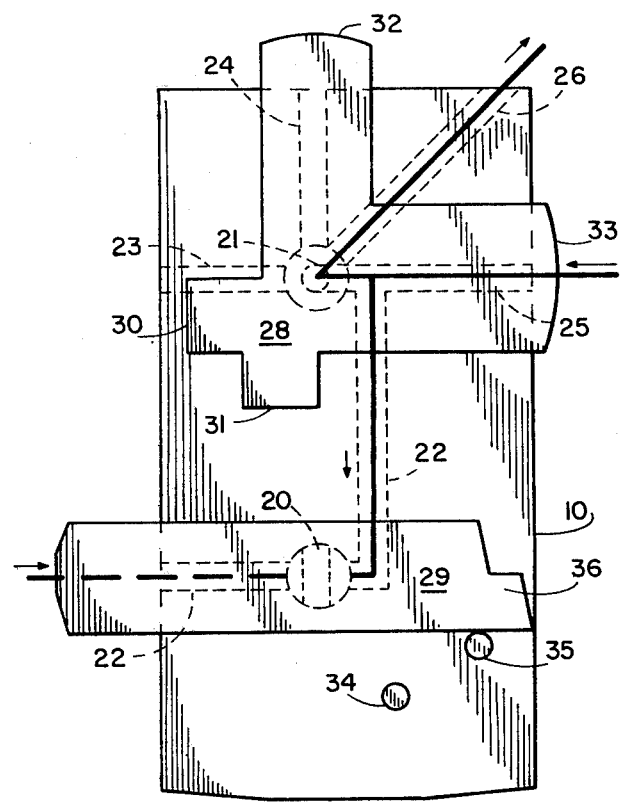
FIG. 7: Vent Snubber
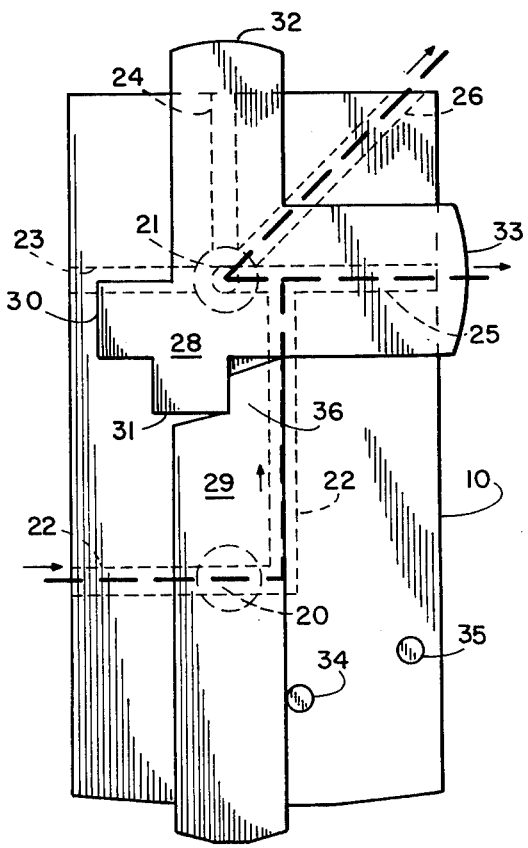
FIG. 8: Vent Reservoir Tank

CONTROL MANIFOLD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The launching of air or undersea vessels requires that a nonvaried sequence be rigidly adhered to; particularly, in the case of systems relying upon pressurized gas as the motivating force for a catapult or launching ram the high pressure of the working fluid presents formidable potential for failure, damage or, even worse injury. Heretofore, a combination of three way valves, lead valves and several tapped pressure fittings have been employed in an undersea launcher of torpedo-like vehicles. In case of a malfunction a pressure fitting needed to be uncapped, a pressure source connected and pressure applied. Next, the pressure needed to be released, the pressure source removed and the fitting recapped. This sequence was time consuming and, because the valves were individually operated in this pressurization sequence with no interlocking among them, the untimely operation of the launcher might occur with the attendant hazardous exposure of personnel and the vessel itself. The launcher was modified by introducing a tank for bleeding-off the pressurized working fluid in the lines and other elements of the launcher. This modification called for an additional valve which had to be operated in conjunction with the three way valve. In the case where more than one operator initiated the launching or resetting sequence, the number of valves and pressure fittings were likely to create problems if operated out of sequence.

There is a continuing need in the state-of-the-art for a single control manifold which has only a single pair of valves operated by handles having specific configurations to allow the venting of gases and the readying of the launcher in a predetermined sequence.

SUMMARY OF THE INVENTION

The present invention is directed to providing an apparatus for controlling the venting of pressurized gas from a launcher. A manifold block is provided with a high pressurized gas passage, a receiver passage, a piston return passage, a snubber passage and a vent passage. The block is further provided with a vent recess communicating with all of the aforestated passages and a high pressure gas recess communicating with the high pressure gas passage. The high pressure gas valve is rotatably mounted in the high pressure gas recess and has a lateral bore selectively rotated to be in communication with the high pressure gas passage. A venting valve is rotatably mounted in the vent recess and has a port selectively rotated to communicate the vent passage with the high pressure gas passage, snubber passage, piston return passage, and the receiver passage. A high pressure gas valve handle is mounted on the high pressure gas valve for imparting rotational motion to the valve and selectively aligning its bore with the high pressure gas passage. A venting valve handle is mounted on the venting valve for imparting rotational motion to the valve to align its port with a selective one of the passages and for blocking rotational motion of the high pressure gas valve handle at predetermined positions to assure that the predetermined sequence is followed. Further assurance of following the predetermined sequence is attributed to a one way rotational permitting means mounted on the manifold block and engaging the valve handle which allows only one way rotation of the venting valve.

A primary object of the invention is to provide a control manifold which assures a following of a predetermined sequence.

Another object is to provide a control manifold which reduces the hazards associated with launching an undersea missile.

Still another object is to provide a control manifold employing a pair of rotatable valves for alignment of a number of passages which has handles configured to assure a predetermined sequence of operation.

Still another object is to provide a control manifold with a pair of rotatable valves which rotate in only one direction or between preestablished limits.

A further object is to provide a control manifold ideally suited for readying a launcher of ordnance for a subsequent shot.

Still another object of the invention is to provide a control manifold that is compact and sized for actuation by a single operator.

These and other objects of the invention will become more readily apparent from the ensuing specification when taken together with the drawings.

BRIEF DESCRIPTION OF THE DRAWINGS

FIG. 2a is a cross-sectional view of the invention along lines 2a—2a in FIG. 1a.

FIG. 2b is a representation of the back of the handles as well as the ratchet on the backside of the venting valve taken along lines 2b—2b in FIG. 1a.

FIG. 2c is a representation of a portion of the invention taken along lines 2c—2c in FIG. 1a.

FIG. 3 is the manifold in the ready to fire position.

FIG. 4 is the vent valve in the vent receiver tank position.

FIG. 5 shows the manifold in the vent drive piston position.

FIG. 6 depicts the vent valve in the drive piston return pressure assist position.

FIG. 7 shows the arrangement of the valves as the manifold vents the snubber.

FIG. 8 shows the manifold as it vents the gas reservoir.

DESCRIPTION OF THE PREFERRED EMBODIMENT

Figure 1:
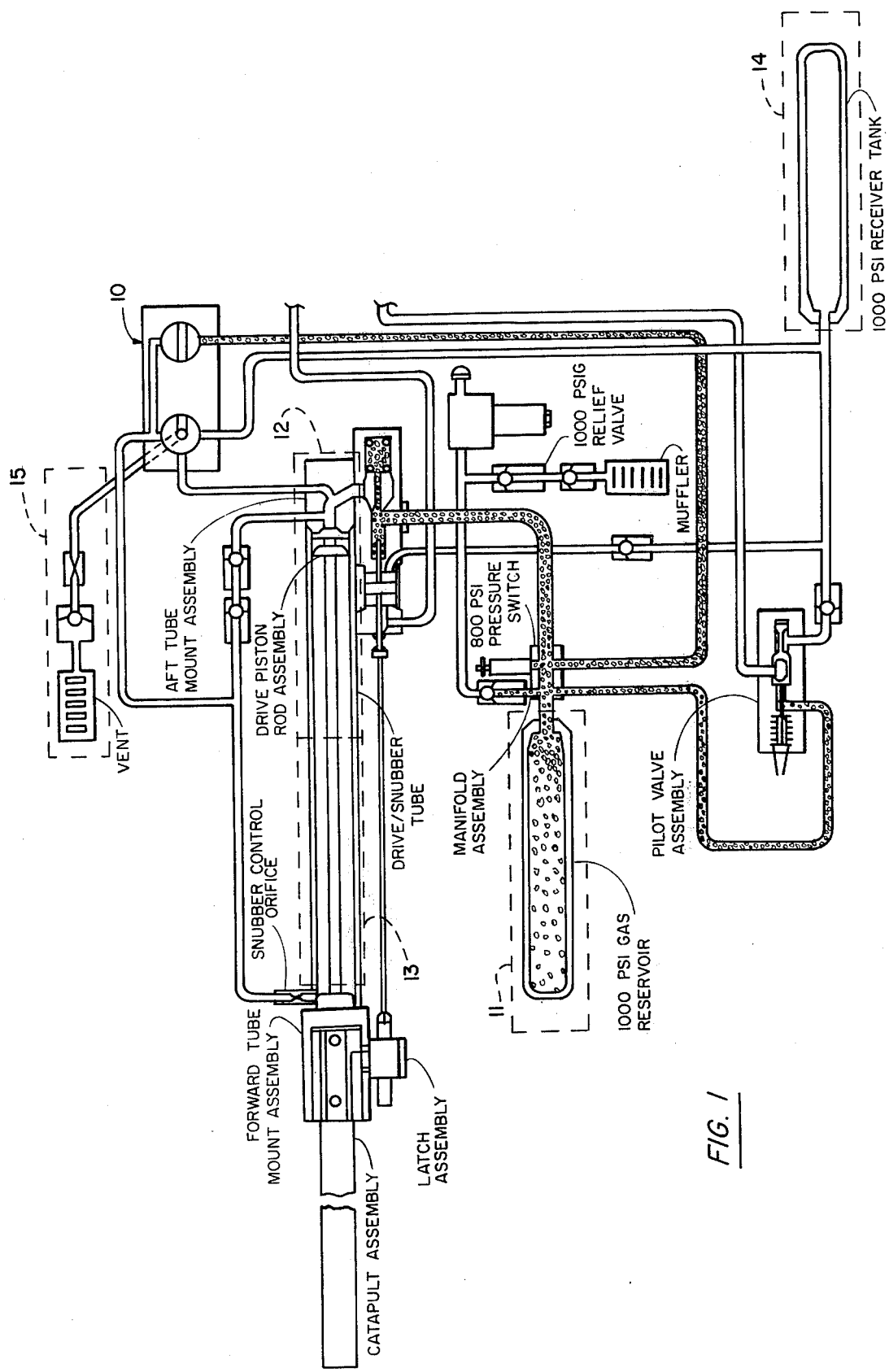
FIG. 1 schematically depicts the invention operatively connected in a typical launching system.

Referring now to FIG. 1 of the drawings a schematic depiction of a control manifold 10 is operatively connected to a representative launching system. The launching system in this case is for the launching of a torpedo-like vehicle and, most assuredly, launchers for flying missiles have a good deal in common with the one shown.

This typical system has an air reservoir 11 which feeds pressurized gas to a drive piston rod assembly 12. As gas is vented into the drive piston rod assembly, a catapult assembly connected to the missile ejects the missile from its launch tube. A drive/snubber tube 13 prevents the piston rod from being damaged during the launching sequence by trapping a cushioning volume of gas on the other side of the piston. After the torpedo or missile has been launched the gas used to eject the missile is vented to a receiver tank 14 in a manner to be elaborated on below. Lastly, after the vehicle or missile has been launched the elements, thusly referred to, are depressurized through a vent 15. After this sequence has been followed the launching system is once again in the ready to fire position for another missile or vehicle.

Control manifold 10 is fashioned from a block of stainless steel. Stainless steel was chosen because of its demonstrated capability to resist corrosion and its toughness. Obviously, other materials could be selected to adapt to a variety of applications.

A pair of recesses 16 and 17 are bored in the control manifold block to receive appropriately sized valves, a high pressure gas valve 18 in recess 16 and a venting valve 19 in recess 17.

Both valves are cylindrical in shape and are sized to rotatably fit within the two recesses. They are sealed and secured in the recesses according to techniques well established in the art and each have an axial pin which extends upwardly from the face of the control manifold.

High pressure gas valve 18 is provided with a lateral bore 20 and venting valve 19 is provided with an essentially L-shaped port 21. The L-shaped port is arranged so that one portion of it radially extends from the center of the venting valve while the other portion extends coaxially toward the back of the control manifold.

A high pressure gas passage 22 is provided in the control manifold so that when the high pressure gas valve 18 is rotated to align its lateral bore with the passage, high pressure gas is free to flow into the manifold. At the venting valve end of the manifold a receiver tank passage 23, a drive piston return passage 24 and a snubber passage 25 are provided in the manifold to communicate with recess 17 in essentially the same lateral plane. This same lateral plane is the lateral plane with which the radially extending portion of the L-shaped port 21 communicates as the venting valve 19 is rotated in the recess.

A vent passage 26 is in communication with the coaxial portion of the L-shaped port so that as venting valve 19 is rotated to communicate the port with the high pressure gas passage, the receiver tank passage, the drive piston return passage and the snubber passage, they vent gas through passage 26 and to vent 15. At this point it should be noted that the high pressure gas passage 22 is effectively coupled to vent 15 when the venting valve is switched to communicate with snubber passage 25 since the high pressure gas passage is in communication with the snubber passage.

The coaxial pins provided on both the high pressure gas valve 18 and the venting valve 19 extend through the manifold face and, if desired, a cover plate 27 secured to the face of the manifold (appropriate legends may be included on the plate to provide an operator with a visual representation of the valve's position). The pins reaching from the valves are secured by means of a set screw in the venting valve handle 28 and the high pressure gas valve handle 29 when the pins are inserted in a hole 28a or 29a in the respective valves.

Venting valve 19 is provided with a pair of projections 30 and 31 orthogonally disposed with respect to one another and a pair of arms 32 and 33 similarly orthogonally disposed from one another. The arms are sized to be larger than the projections to restrict the rotation of high pressure gas handle 29 when it is in certain positions. As will become more apparent from the following, this feature helps assure that a predetermined sequence of operation is followed.

Figure 1A:
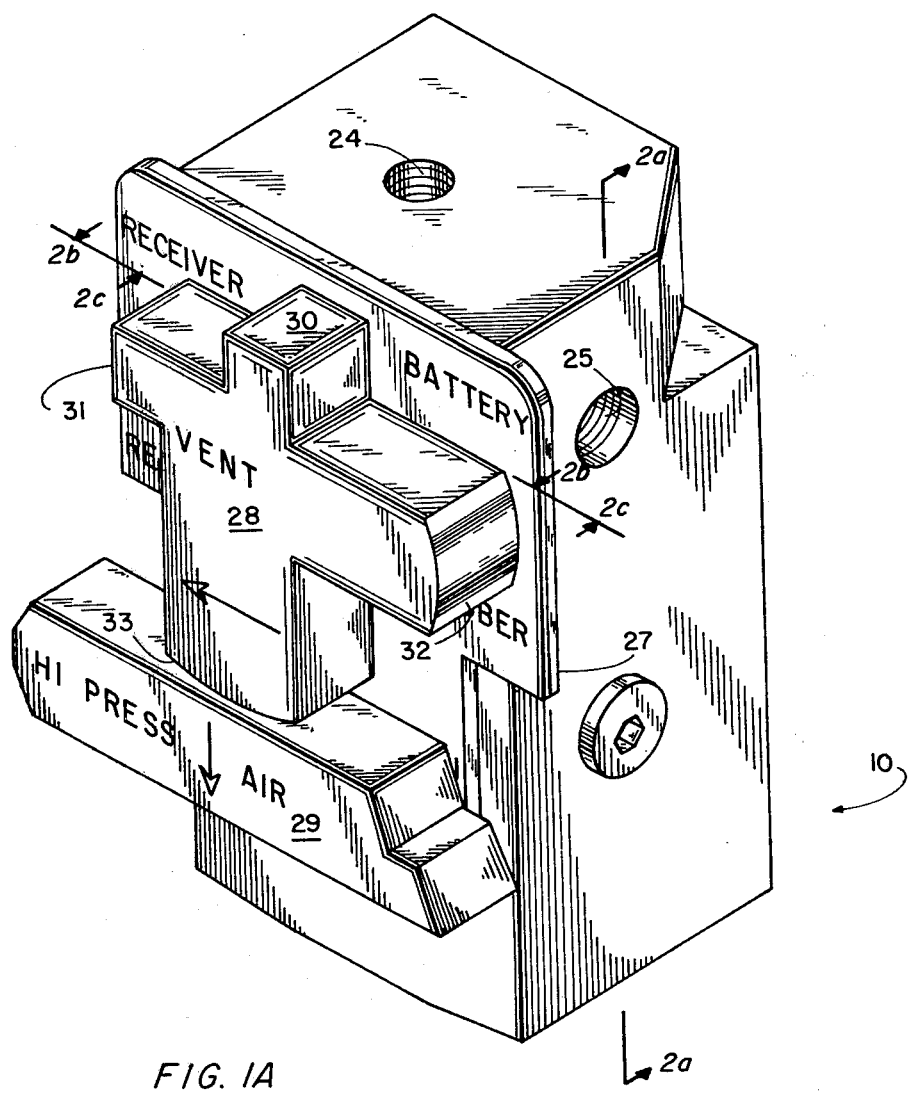
FIG. 1a is an isometric view of the invention.

A pair of pins 34 and 35, see FIGS. 1a, 2c and FIG. 3 through B, contain the high pressure gas handle within a bidirectional ninety degree arc of travel. This amount of travel is sufficient to align the lateral bore of the high pressure gas valve with the high pressure gas passage or to block it. The ninety degree arc of travel will place an extension 36 of the high pressure gas handle abutting either projection 30 or 31 of the venting valve handle 28 when it is suitably rotated.

Further reliable operation is provided for by including a spring biased pawl 37 on the face of the control manifold which engages a ratchet 38 consisting of four orthogonally disposed machined inclines on the inside of venting valve handle 28. Thus, the venting valve handle can rotate the venting valve in only one direction due to the mechanical coaction between the pawl 37 and the ratchet 38.

The foregoing structure possesses the capability for ensuring that an operator follows a preestablished sequence of operation. Referring to FIGS. 1 and 3 in the drawings, a control manifold is depicted in the "ready to fire" position. High pressure gas valve 18 and venting valve 19 are positioned so that their respective lateral bore and L-shaped port switch all but venting passage 26 out of the launcher system.

After pressurized gas is released from high pressure gas reservoir 11 and displaces the drive piston rod to actuate the catapult assembly, a portion of the pressurized gas is fed through a pilot valve assembly to receiver tank 14. Consequently, after the missile has been launched, the first step is to bleed the gas from receiver tank 14.

Noting FIG. 4, venting valve handle 28 is rotated 90 degrees clockwise to align L-shaped port 21 of venting valve 19 with receiver tank passage 23. Any pressurized gas in the tank is vented through vent 15 via receiver tank passage 23, L-shaped port 21 and venting passage 26. The high pressure gas handle cannot be rotated to feed high pressure gas from reservoir 11 through the launching system since arm 32 abuts the high pressure gas handle and prevents it from rotating.

The next step in preparing the launcher system for refiring is to vent the pressurized gas now contained on the right side of the piston of drive piston rod assembly 12. Venting the drive piston assembly calls for rotating venting valve handle another ninety degrees clockwise to align L-shaped port 21 with drive piston return passage 24 in the control manifold, see FIG. 5. Thus, the complete passageway from piston assembly 12 to vent 15 takes the path of drive piston return passage 24, L-shaped port 21 and venting passage 26.

If a drive piston rod pressure assist is needed, that is to say, if there need be the introduction of pressurized gas through the snubber to return the piston to the far right end of the drive/snubber tube, then high pressure gas reservoir 11 is switched through the control manifold. Note FIG. 6 which shows that high pressure gas handle 29 is rotated ninety degrees counter clockwise so that its extension 36 rests on projection 30. Gas is fed to the back of the piston through the drive snubber to displace the piston to the right.

Next, the snubber is vented by rotating venting valve handle ninety degrees clockwise to couple L-shaped port 21 with snubber passage 25 and venting passage 26. The high pressure gas handle 29 has since been rotated ninety degrees clockwise to take its lateral bore 20 out of alignment with high pressure gas passage 22.

From time to time maintenance or equipment failure in some portion of the launching system may require that the high pressure gas reservoir be vented. In this situation the manifold is actuated to assume the representation of FIG. 8. The high pressure gas handle is rotated 90 degrees counter clock wise so that its extension rests on projection 31. Pressurized gas passes easily from reservoir 11 through high pressure gas passage 22, through lateral bore 20 and once again through another portion of high pressure gas passage 22 to snubber passage 25, through L shaped port 21 and out to vent 15 via the venting passage 26.

Obviously, many modifications and variations of the present invention are possible in the light of the above teachings, and, it is therefore understood that within the scope of the disclosed inventive concept, the invention may be practiced otherwise than specifically described.

What is claimed is:

1. An apparatus for controlling the venting of pressurized gas from a launcher comprising:

a manifold block provided with a high pressure gas passage, a receiver tank passage, a piston return passage, a snubber passage, and a vent passage, the manifold block is further provided with a vent recess communicating with all the aforestated passages and a high pressure gas recess communicating with the high pressure gas passage;

a high pressure gas valve rotatably mounted in the high pressure gas recess having a lateral bore selectively rotated to be in communication with the high pressure gas passage;

a venting valve rotatably mounted in the vent recess having a port selectively rotated to communicate the vent passage with the high pressure gas passage, snubber passage, piston return passage and the receiver tank passage;

high pressure gas valve handle means mounted on the high pressure gas valve for imparting rotational motion thereto;

venting valve handle means mounted on the venting valve for imparting rotational motion thereto and for blocking rotational motion of the high pressure gas valve handle means at predetermined positions; and means mounted on the manifold block and engaging the venting valve handle for permitting only a one-way rotation thereof.

2. An apparatus according to claim 1 in which the venting valve handle means is provided with a pair of projections orthogonally disposed with respect to one another to permit rotation of the high pressure gas valve handle means and a pair of arms othogonally disposed with respect to one another to block rotation of the high pressure gas valve.

3. An apparatus according to claim 2 in which the pair of projections are located on the venting valve handle means to permit rotation of the high pressure gas valve handle means when the venting valve port is in communication with either the piston return passage or the snubber passage and high pressure gas passage and the pair of arms are located on the venting valve handle means to block rotation of the high pressure gas valve handle means when the venting valve port is in communication with the receiver tank passage or is communicating only with the venting passage.

4. An apparatus according to claim 3 further including:

means for stopping the degree of rotation of the high pressure gas valve handle means to assure alignment of the lateral bore with the high pressure gas passage.

5. An apparatus according to claim 4 in which the manifold block is metal and the passages and recesses are bored therein.

6. An apparatus according to claim 5 in which the one-way rotation permitting means is a spring biased pawl engaging machined ratchet surfaces on the venting valve handle.

7. An apparatus according to claim 6 in which the stopping means is a pair of pins secured to the manifold block to allow only a bidirectional ninety degree rotation.

* * * * *